(12) United States Patent
Lueschen et al.

(10) Patent No.: US 9,079,617 B1
(45) Date of Patent: Jul. 14, 2015

(54) VEHICLE FRONT END JOINT

(71) Applicant: FORD GLOBAL TECHNOLOGIES, LLC, Dearborn, MI (US)

(72) Inventors: Gerhard G. G. Lueschen, Ypsilanti, MI (US); Dragan B. Stojkovic, Taylor, MI (US); Ernest Dicks, Jr., Detroit, MI (US); David Edward Paul, Canton, MI (US); Christopher John May, Novi, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/290,137

(22) Filed: May 29, 2014

(51) Int. Cl.
*B62D 25/04* (2006.01)
*B62D 25/08* (2006.01)
*B62D 27/02* (2006.01)
*B62D 29/00* (2006.01)

(52) U.S. Cl.
CPC .............. *B62D 27/023* (2013.01); *B62D 25/04* (2013.01); *B62D 25/08* (2013.01); *B62D 29/008* (2013.01)

(58) Field of Classification Search
CPC ...... B62D 25/04; B62D 25/08; B62D 25/081; B62D 25/082
USPC ............. 296/187.09, 187.12, 193.05, 193.06, 296/193.09, 192, 203.01–203.03, 29, 30
See application file for complete search history.

(56) References Cited

U.S. PATENT DOCUMENTS

| | | | | |
|---|---|---|---|---|
| 4,270,793 A | * | 6/1981 | Harasaki et al. | 296/192 |
| 4,545,612 A | * | 10/1985 | Harasaki | 296/203.02 |
| 4,883,309 A | * | 11/1989 | Miyazaki et al. | 296/193.09 |
| 5,201,566 A | | 4/1993 | Mori | |
| 5,624,150 A | | 4/1997 | Venier | |
| 6,139,093 A | * | 10/2000 | Elliott et al. | 296/203.02 |
| 6,209,950 B1 | * | 4/2001 | Hanyu | 296/203.02 |
| 6,267,437 B1 | | 7/2001 | Morsch et al. | |
| 6,322,134 B1 | * | 11/2001 | Yang | 296/203.02 |
| 6,416,119 B1 | | 7/2002 | Gericke et al. | |
| 6,679,547 B2 | | 1/2004 | Ju-Sik | |
| 7,036,874 B2 | | 5/2006 | Stojkovic et al. | |
| 7,066,533 B2 | * | 6/2006 | Sohmshetty et al. | 296/203.02 |
| 7,090,273 B2 | | 8/2006 | Stojkovic et al. | |
| 7,118,166 B2 | | 10/2006 | Seksaria et al. | |
| 7,140,672 B2 | | 11/2006 | Chernoff et al. | |
| 7,140,674 B2 | * | 11/2006 | Miyoshi et al. | 296/203.03 |
| 7,243,986 B2 | | 7/2007 | Dupuis et al. | |
| 7,267,394 B1 | | 9/2007 | Mouch et al. | |
| 7,390,056 B1 | | 6/2008 | Stojkovic et al. | |
| 7,574,801 B2 | | 8/2009 | Lowe et al. | |
| 7,798,560 B2 | * | 9/2010 | Hedderly | 296/187.03 |
| 7,871,123 B2 | * | 1/2011 | Stojkovic et al. | 296/193.09 |
| 7,887,122 B2 | | 2/2011 | Baccouche et al. | |
| 8,002,337 B2 | * | 8/2011 | Baccouche et al. | 296/203.02 |
| 8,201,873 B2 | | 6/2012 | Nishimura et al. | |

(Continued)

*Primary Examiner* — Gregory Blankenship
(74) *Attorney, Agent, or Firm* — Jason Rogers; Brooks Kushman P.C.

(57) ABSTRACT

A body structure for a vehicle includes a cowl side defining a first vertical and longitudinal plane. A hinge pillar including a tab portion is attached to the cowl side in the first plane. The hinge pillar includes a stepped surface defining a second vertical and longitudinal plane that is offset outwardly from the first plane and parallel to the first plane. A front end rail includes an inner sidewall fastened to the cowl side and an outer sidewall fastened to the stepped surface the stepped surface. The longitudinal loads applied to the front end rail are transferred in shear to the hinge pillar and cowl side.

20 Claims, 4 Drawing Sheets

(56) References Cited

U.S. PATENT DOCUMENTS

| | | |
|---|---|---|
| 8,517,458 B2 | 8/2013 | Lassl et al. |
| 8,550,545 B1 * | 10/2013 | Stojkovic et al. ........ 296/193.09 |
| 8,651,563 B2 * | 2/2014 | Mildner et al. .......... 296/203.02 |
| 8,727,428 B2 * | 5/2014 | Takeuchi et al. ......... 296/203.02 |
| 8,833,832 B2 * | 9/2014 | Whipps .......................... 296/29 |
| 2002/0096384 A1 | 7/2002 | Yoshida et al. |
| 2006/0108837 A1 | 5/2006 | Deme et al. |

* cited by examiner

VEHICLE FRONT END JOINT

TECHNICAL FIELD

The present disclosure relates to a vehicle front end structure for joining a front end rail to a vehicle passenger cabin.

BACKGROUND

Vehicle front end structures provide mounting features for various vehicle components including body panels, hoods, and engine components. The front end structure may further be utilized to manage loads from vehicle impact and other sources. Particularly with the use of advanced lightweight materials, the joining method of the front structure to a vehicle cabin may have a direct relation to vehicle functional performance.

SUMMARY

According to an aspect of the present disclosure, a joint assembly includes a cowl side panel, a hinge pillar and a front end rail. The hinge pillar has a vertical surface attached to the cowl side panel in a first vertical/longitudinal plane. The front end rail includes an inner sidewall fastened to the cowl side panel and an outer sidewall fastened to the hinge pillar in a second vertical/longitudinal plane. The longitudinal loads applied to the front end rail are transferred in shear to the hinge pillar and cowl side panel.

According to another aspect of the present disclosure, a body structure for a vehicle includes a cowl side defining a first vertical and longitudinal plane. A hinge pillar includes a tab portion that is attached to the cowl side in the first plane. The hinge pillar includes a stepped surface defining a second vertical and longitudinal plane that is offset outwardly from the first plane and parallel to the first plane. A front end rail includes an inner sidewall fastened to the cowl side and an outer sidewall fastened to the stepped surface. The longitudinal loads applied to the front end rail are transferred in shear to the hinge pillar and cowl side.

According to yet another aspect of the present disclosure, a vehicle includes a cowl side panel, a hinge pillar and a front end rail. The hinge pillar has a vertical surface attached to the cowl side panel in a first vertical/longitudinal plane. The front end rail includes an inner sidewall fastened to the cowl side panel and an outer sidewall fastened to the hinge pillar in a second vertical/longitudinal plane. The longitudinal loads applied to the front end rail are transferred in shear to the hinge pillar and cowl side panel.

According to additional aspects of the present disclosure, the joint assembly may include a cowl top fastened to an upper sidewall of the front end rail. The lateral loads applied to the rail are transferred in shear to the cowl top. The joint assembly may also include a lateral step formed on the hinge pillar. The lateral step provides a continuous surface transition between the first and second planes. The rail, hinge pillar, cowl side panel and other components may be made of an aluminum alloy. Using aluminum alloy components saves weight and increases fuel economy.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

A common multiple axis system is used in each of the figures to indicate relative directions with respect to the vehicle. An X-axis denotes a longitudinal direction, a Y-axis denotes a lateral direction, and a Z-axis denotes a vertical direction.

Figure 1:
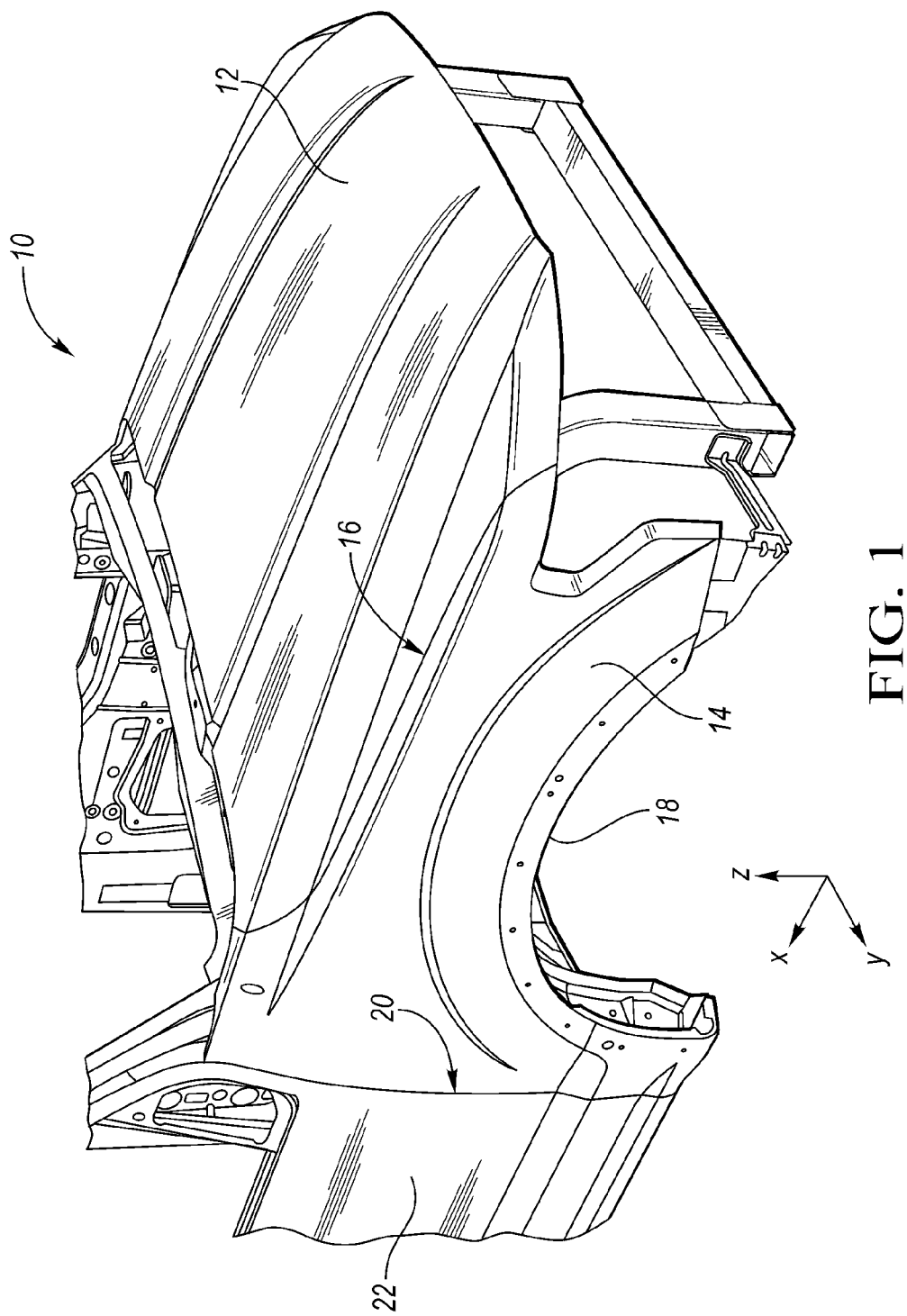
FIG. 1 is a front right side perspective view of a portion of a front end of a vehicle.

Referring to FIG. 1, a front end of a vehicle 10 is depicted that supports several outer panels. A hood 12 is hinged and covers an engine compartment in a closed position. Access to the engine compartment is allowed when the hood 12 is rotated to an open position. Each of a pair of fenders 14 is adjacent to the hood 12 on either side. The fenders 14 are fixed and create a margin gap 16 to the hood 12. The fenders 14 also create an interface to a front wheel well 18 at a lower portion. At a rear portion, the fenders 14 create a margin gap 20 to a side door 22. Both of the fenders 14 and the hood 12 require sufficient underlying front end structure in order to maintain proper fit relative to each other, as well as operability.

Figure 2:
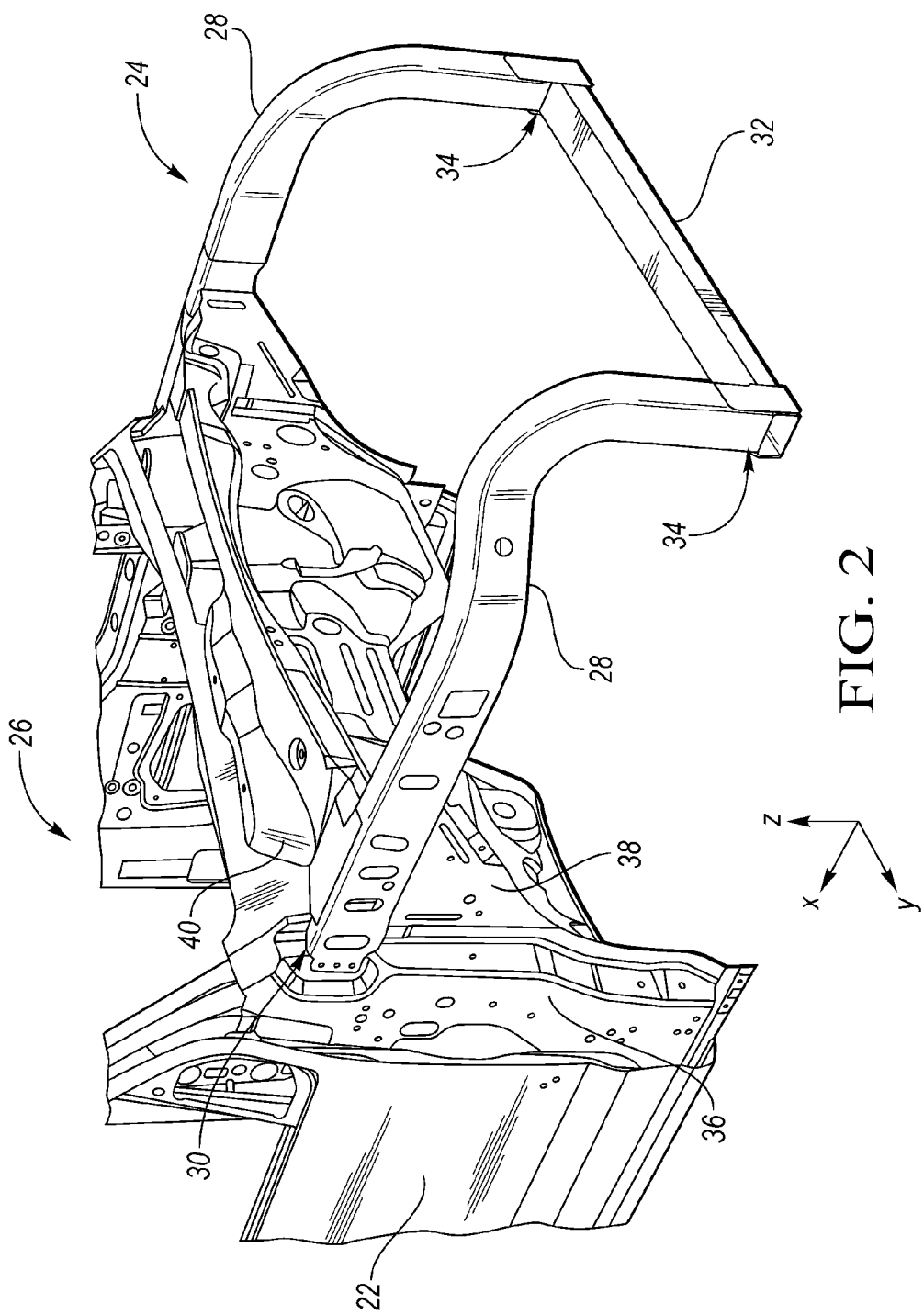
FIG. 2 is a front right side perspective view of a structural support of the vehicle of FIG. 1.

Referring to FIG. 2, a front end structure 24 extends forward from a passenger cabin 26. The front end structure 24 provides mounting support for the hood 12, fenders 14 and other front end components. The front end structure 24 includes a pair of front end rails 28 that extend longitudinally from the passenger cabin 26. Each front end rail 28 is formed as a hollow structure having a rear end 30 that interfaces with the hinge pillar 36 and cowl side panel 38 of the passenger cabin 26. A cowl top 40 is disposed over the plenum and is fastened to an upper sidewall of the rails 28. The cowl top 40 spans between the pair of rails 28 and provides additional lateral support to the front end structure 24. The front end rails 28 may be shaped by hydroforming extruded aluminum alloy tubes. A forward lateral member 32 extends across the vehicle and interconnects each of the front end rails 28 at a front end 34 of each rail 28.

The front end rails 28 may be substantially straight in a region near the rear end 30 that attaches to the passenger cabin 26. The substantially straight portions enhance load carrying capabilities of the front end rails 28. The rails 28 may be made of 6011-T4 aluminum alloy. The wall thickness of the rail may be from about 2 mm to 5 mm. Alternatively, the wall thickness may be about 3.1 mm. The rail 28 may be formed from different structural materials, such as steel, magnesium, titanium, polymers, composite materials, and the like.

Figure 3:
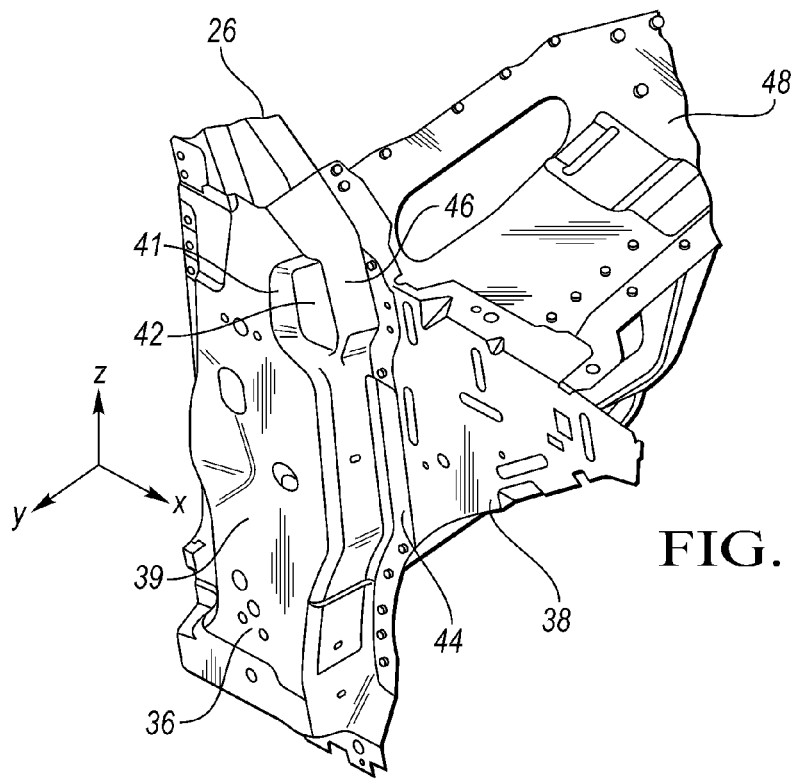
FIG. 3 is a front right side perspective view of an exterior of a passenger cabin with a front end rail and body panels removed.

Referring to FIG. 3, the front end of the vehicle 10 is shown with the body panels and front end rails 28 removed. The cab 26 includes a cowl side panel 38. The cowl side panel 38 defines a first vertical and longitudinal plane that is in the X-Z plane. A hinge pillar 36 is connected to the rear portion of the cowl side panel 38 at a flange 44. The flange 44 is also in the X-Z plane. The hinge pillar 36 and the cowl side panel 38 may be attached by rivets, bolts, screws, adhesive or welding. In one embodiment, the hinge pillar 36 and cowl side panel 38 are aluminum alloy and are fastened together with rivets. The hinge pillar 36 includes an inner surface (not visible) and an outer surface 39 that may lie in a second vertical/longitudinal plane. The hinge pillar 36 also has a pocket 41 recessed into the outer surface 39 of the hinge pillar 36. The pocket 41 includes a stepped surface 42 that lies in a third vertical and longitudinal plane that is in the X-Z plane. The second plane is offset rearward and outward relative to the first plane. The stepped surface 42 is offset laterally outward from the flange 44 in the Y direction. A laterally extending step 46 interconnects the stepped surface 42 and the flange 44 providing a continuous surface transition. The width of the laterally extending step 46 corresponds to the width of the rail 28. The hinge pillar and cowl side panel cooperate with the rail 28 and allow the rail to nest with the hinge pillar 36 and the cowl side panel 38. A plenum 48 is attached to an inside surface of hinge pillar 36 and an inside surface of the cowl side panel 38.

Figure 4:
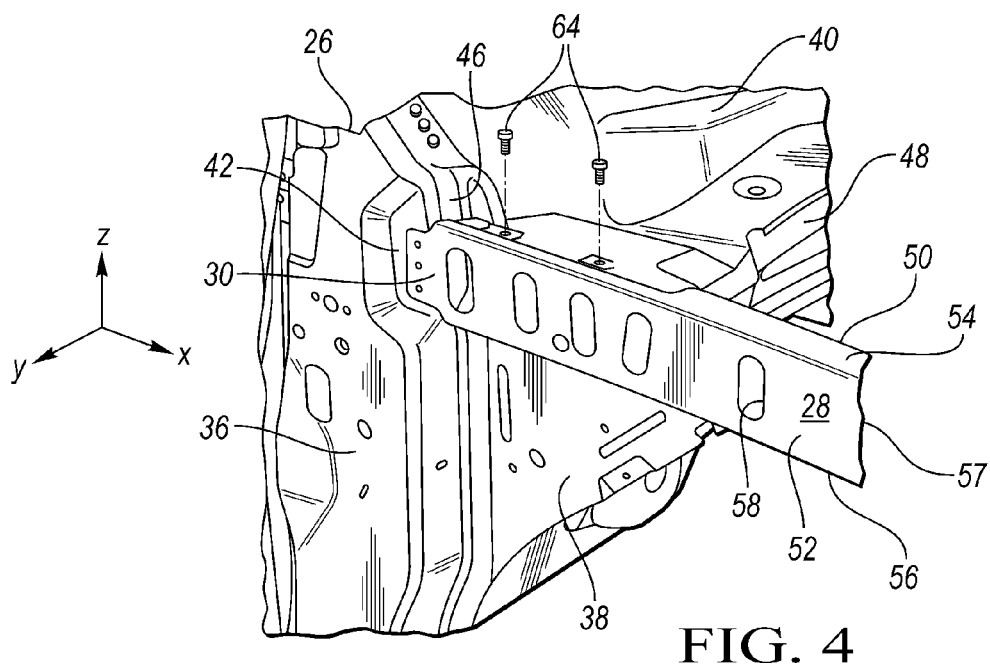
FIG. 4 is a fragmentary perspective view of a structural joint.
Figure 5:
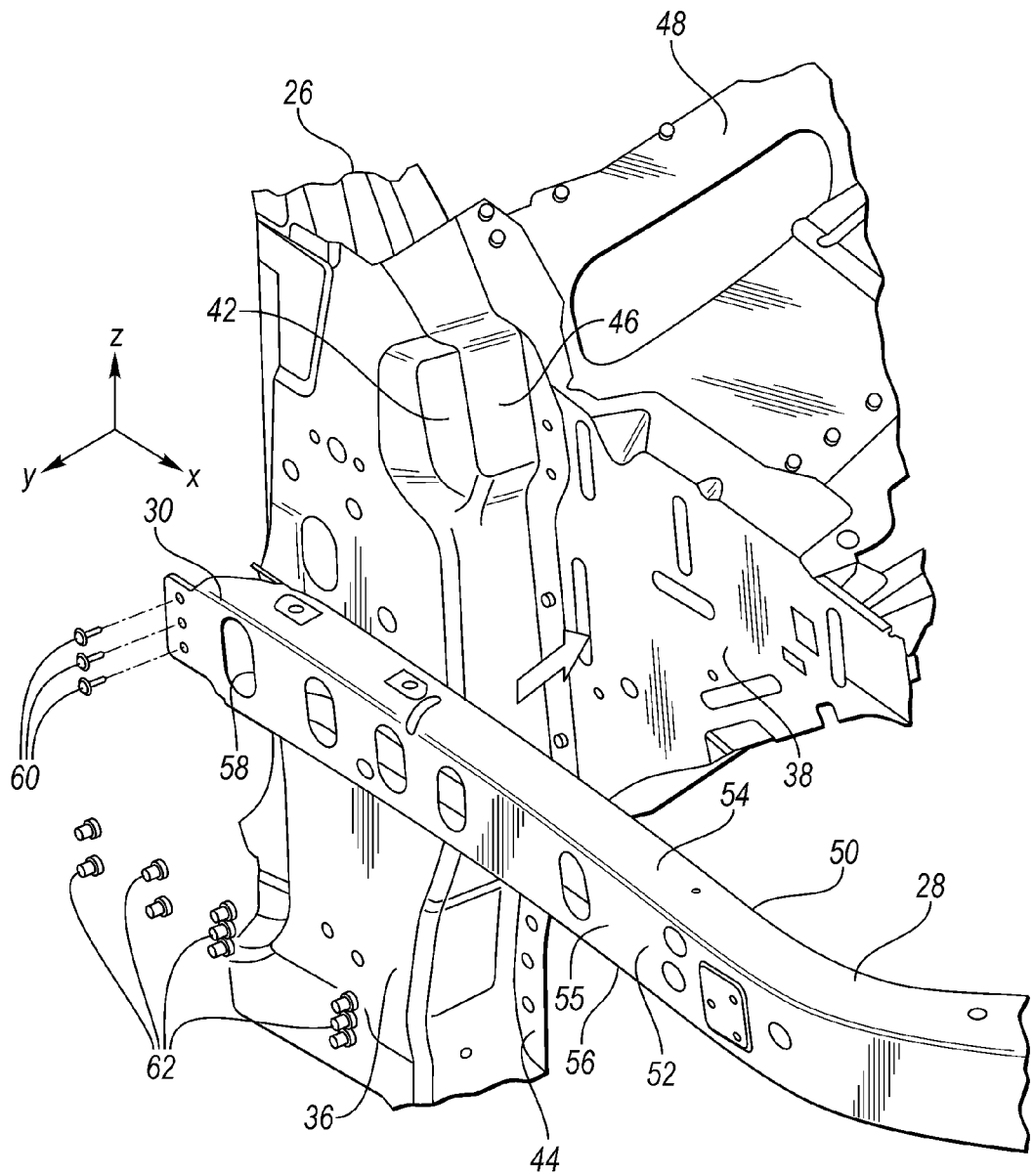
FIG. 5 is an exploded view of the structural joint.

Referring to FIGS. 4 and 5, a front end structural joint is shown. The front end rail 28 is attached to the passenger cabin 26. The front end rail 28 includes an inner sidewall 50 and an outer sidewall 52 that is opposite the inner sidewall. The outer sidewall 52 includes an exterior surface 55 and an interior surface 57. The rail 28 also includes an upper sidewall 54 and a lower sidewall 56 along portions of the rail 28. The upper and lower sidewalls oppose each other. The sidewalls cooperate to define a tubular structure that defines an interior cavity. At the rear end 30, the rail 28 only includes the opposing inner and outer sidewalls 50, 52. The inner and outer sidewalls extend away from the tubular portion of the rail 28 to match the shape of the hinge pillar 36 allowing the rear portion 30 to nest with the hinge pillar 36. The rail 28 includes a substantially straight portion extending from the rear portion 30 forward of the cowl side panel 38. The straight portion has a uniform cross-sectional shape reducing tooling needed to impart more complex formations and bends on the rail 28. The straight portion of the rail 28 also allows for more direct load transfer and increased part stiffness. Each rail 28 also includes a plurality of access holes 58 cut into the outer sidewall 52. The access holes allow fasteners and tools to access the inner sidewall 50 for attachment of the inner sidewall to the cowl side panel 38 and hinge pillar 36.

Each rail 28 is attached to the hinge pillar 36 and the cowl side panel 38. The interior surface 55 of the outer sidewall 52 is attached to the stepped surface 42 at the rear portion 30 of the rail 28. A plurality of rear fasteners 60 secure the outer sidewall 52 to the stepped surface 42. The rear fasteners 60 are normal to the stepped surface 42 and lie in the Y-Z plane. The fasteners may be flow drilling screws. The flow drilling screws are self-threading and reduce the need for precise hole alignment prior to joining the components. The inner sidewall 50 is attached to the cowl side panel 38. A plurality of forward fasteners 62 secure the inner sidewall 50 to the cowl side panel 38. The forward fasteners 62 are normal to the cowl side 38 and lie in the Y-Z plane. The forward fasteners and the rear fasteners are parallel to each other. The forward fasteners 62 are installed through the access holes 58. This allows the forward fasteners 62 to be installed from the outside of the vehicle. The forward fasteners 62 may be self-piercing rivets. Adhesive is applied along the inner sidewall cowl side jointing surface to bond the inner sidewall 50 to the cowl side panel 38. The adhesive provides additional strength to the joint.

The rear and forward fasteners are installed on the vehicle from the outside of the vehicle. This allows the rails 28 to be installed and removed from the outside of the vehicle. Traditional joint arrangements required access to both the inside and outside of the joint in order to service the joint. Accessing the interior of the joint requires the removal of interior vehicle components, which increases the time and cost to service the joint. The present design provides a joint that is fully serviceable from the outside of the vehicle. A technician need only remove exterior body panels to gain access to the rail and the fasteners.

A cowl top 40 is disposed on top of the rails 28 and the plenum 48. The cowl top 40 is attached to the upper sidewall 54 of each rail 28. Hood mounts (not shown) are disposed on the cowl top 40 and are fastened to the upper sidewall 54. A plurality of top fasteners 64 secure the cowl top 40 and the hood mounts to the upper sidewall 54. The top fasteners 64 may be rivets, bolts or screws. The top fasteners 64 are installed on the vehicle from the outside of the vehicle and are fully serviceable from the outside of the vehicle.

The joint is arranged to transfer loads from the rail 28 to the passenger cabin 26 predominately in shear. This is accomplished by attaching the rail 28 to the passenger cabin in two parallel planes. The fastener arrangement aids in transferring the loads in shear. The rear fasteners 60 and the forward fasteners 62 are parallel to each other and are normal to their respective attachment surfaces. The rear and forward fasteners are also perpendicular to the longitudinal and vertical axes of the rail 28. Thus, longitudinal and vertical forces on the rail 28 are transferred in shear at the hinge pillar connection and at the side cowl connection. The top fastener 64 is perpendicular to both the rear and forward fasteners 60, 62. The top fastener 64 is perpendicular to the lateral and longitudinal axes of the rail 28. Thus, lateral and longitudinal forces are transferred in shear at the cowl top connection.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A joint assembly for a vehicle comprising:
   a cowl-side panel;
   a hinge pillar having a vertical surface attached to the cowl-side panel in a first vertical/longitudinal plane, and an outer side;
   a pocket recessed into the outer side of the hinge pillar and defining a stepped surface that faces outwardly from the hinge pillar, wherein the stepped surface is disposed in a second vertical/longitudinal plane that is offset laterally outward from the first plane and parallel to the first plane;
   a front-end rail including an inner sidewall fastened to the cowl-side panel, and an outer sidewall having an interior surface disposed against and fastened to the stepped surface, wherein longitudinal loads are transferred in shear to the hinge pillar and cowl-side panel.

2. The joint assembly of claim 1 wherein the front-end rail is a single hydroformed aluminum-alloy tube.

3. The joint assembly of claim 1 further comprising a cowl top fastened to an upper sidewall of the front end rail.

4. The joint assembly of claim 1 wherein the hinge pillar further comprising a laterally extending step to provide a continuous surface transition between the first and second planes.

5. The joint assembly of claim 1 wherein the first and second planes are parallel to each other.

6. The joint assembly of claim 3 wherein lateral loads applied to the rail are transferred in shear to the cowl top.

7. The assembly of claim 3 further comprising:
   a first set of fasteners received through the hinge pillar and the outer sidewall;
   a second set of fasteners received through the cowl side panel and the inner sidewall;
   a third set of fasteners received through the cowl top and the upper sidewall; and
   a fourth set of fasteners received through the hinge pillar and the cowl side.

8. The joint assembly of claim 7 wherein the first and second set of fasteners are normal to both the first and second vertical/longitudinal planes.

9. A body structure for a vehicle comprising:
   a cowl-side panel defining a first vertical and longitudinal plane;
   a hinge pillar having an outer side and an inner side, the hinge pillar including a flange attached to the cowl-side panel in the first plane and including a stepped surface recessed into the outer side and defining a second vertical and longitudinal plane that is offset laterally outward from the first plane and parallel to the first plane; and
   a front end rail including an inner sidewall fastened to the cowl-side panel and an outer sidewall fastened to the stepped surface, wherein longitudinal loads are transferred in shear to the hinge pillar and the cowl-side panel.

10. The body structure of claim 9 further comprising an adhesive disposed between the cowl-side panel and inner sidewall to bond the inner sidewall to the cowl-side panel.

11. The body structure of claim 9 further comprising a cowl top fastened to an upper sidewall of the front end rail.

12. The body structure of claim 9 wherein the outer side wall includes an access hole.

13. The body structure of claim 11 wherein lateral loads applied to the rail are transferred in shear to the cowl top.

14. The body structure of claim 11 further comprising:
   a first set of fasteners received through the hinge pillar and the outer sidewall;
   a second set of fasteners received through the cowl side panel and the inner sidewall;
   a third set of fasteners received through the cowl top and the upper sidewall; and
   a fourth set of fasteners received through the hinge pillar and the cowl side.

15. The body structure of claim 14 wherein the first and second set of fasteners are normal to both the first and second planes.

16. The body structure of claim 9 wherein the hinge pillar further comprising a laterally extending step connected between the flange and the stepped surface to provide a continuous surface transition between the flange and the stepped surface.

17. The body structure of claim 9 wherein the front end rail is made of an aluminum alloy and wherein the hinge pillar and the cowl side panel are made of an aluminum alloy.

18. The body structure of claim 9 wherein the hinge pillar and the cowl side panel are made of an aluminum alloy.

19. A vehicle comprising:
   a cowl-side panel;
   a hinge pillar having a vertical surface attached to the cowl-side panel in a first vertical/longitudinal plane, and an outer surface in a second vertical/longitudinal plane; and
   a front-end rail including an inner sidewall fastened to the cowl-side panel and an outer sidewall having an interior surface disposed against and fastened to the outer surface of the hinge pillar.

20. The vehicle of claim 19 wherein the hinge pillar, front-end rail and the cowl side panel are made of an aluminum alloy.

* * * * *